June 14, 1949.  E. MILLER  2,473,067
MACHINE FOR APPLYING RUBBER
TIRE TREADS TO CARCASSES
Filed Nov. 21, 1946  2 Sheets-Sheet 1
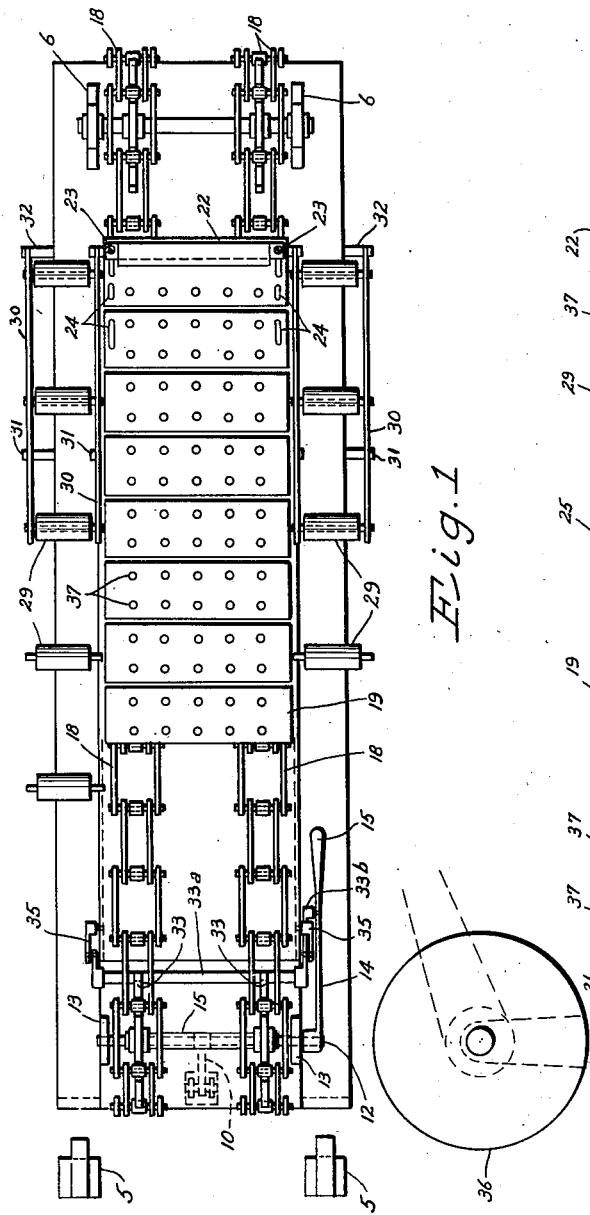
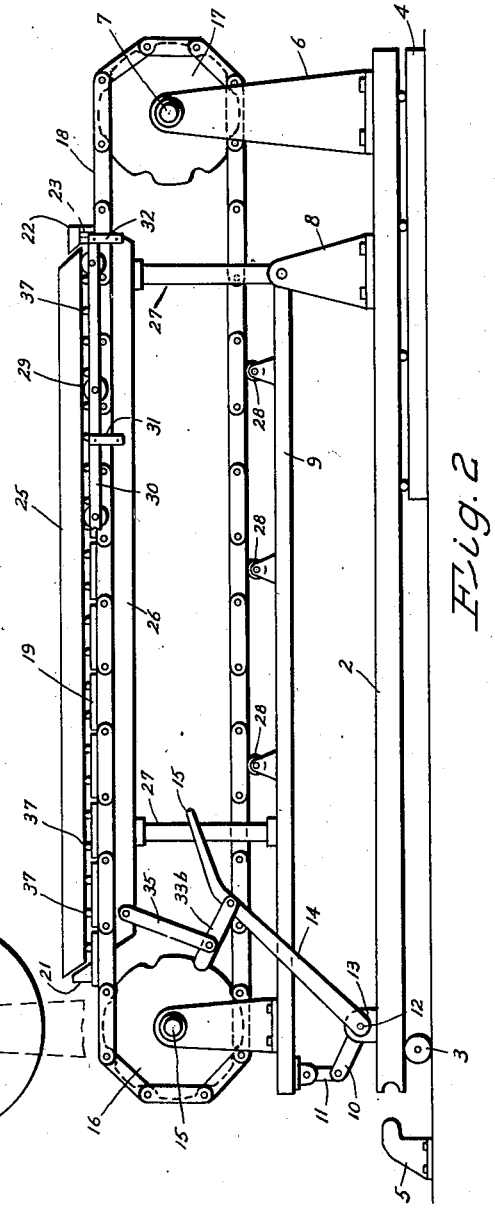
INVENTOR
EDWIN MILLER
BY *Archworth Martin*
ATTORNEY June 14, 1949.  E. MILLER  2,473,067
MACHINE FOR APPLYING RUBBER
TIRE TREADS TO CARCASSES
Filed Nov. 21, 1946  2 Sheets-Sheet 2

INVENTOR
EDWIN MILLER
BY Archworth Martin
ATTORNEY

Patented June 14, 1949

2,473,067

UNITED STATES PATENT OFFICE 2,473,067

MACHINE FOR APPLYING RUBBER TIRE TREADS TO CARCASSES

Edwin Miller, Jeannette, Pa.

Application November 21, 1946, Serial No. 711,413

3 Claims. (Cl. 154—9)

My invention relates to machines for applying rubber tire treads to tire carcasses in the building of tires or the placing of retreads on tires, and has for its object the provision of apparatus whereby treads may be applied to tire carcasses more accurately than has heretofore been conveniently possible, so that not only will the tread fit neatly into place, but will be accurately balanced.

Figure 3:
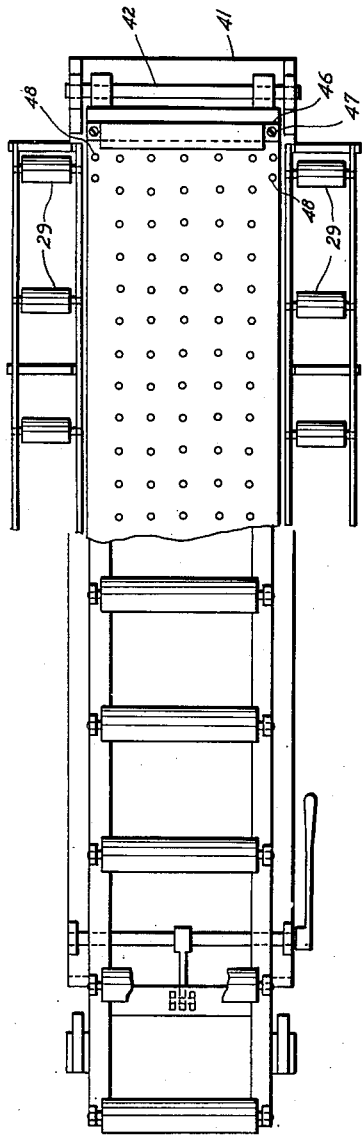
Figure 4:
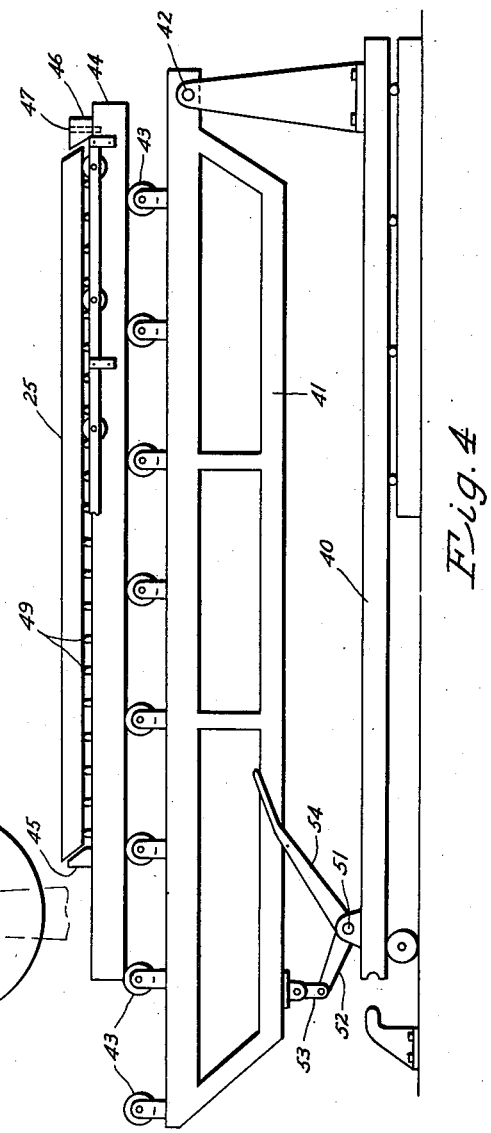

Some of the forms of apparatus for practicing my invention are shown in the accomanying drawings, wherein Figure 1 is a fragmentary plan view of the device; Fig. 2 is a side view thereof; Fig. 3 is a fragmentary plan view showing a modification of the structure of Fig. 1, and Fig. 4 is a side view thereof.

Referring first to Figs. 1 and 2, I show a base 2 that is movably supported on wheels 3 and by anti-friction balls on a plate 4. Centering lugs 5, anchored to the floor, beneath each tire-building drum, will be engaged by recesses in the ends of the base, so that the apparatus will be accurately alined for winding a tread on the drum. On the base 2, I mount pedestal 6 for supporting a conveyor shaft 7 and a conveyor frame 9 at one end. At its other end, the conveyor frame is supported by a crank arm 10 and a link 11, for vertical movement, the crank arm being secured to a rock shaft 12 that is journaled in bearings 13, on the base 2. A lever 14 having a handle or foot pedal 15 will serve as a means for rocking the shaft 12 to raise and lower the inner end of the conveyor frame.

A shaft 15 is journaled in the conveyor frame and carries a pair of sprocket wheels 16. A pair of sprocket wheels 17 are similarly secured to the shaft 7. Conveyor chains 18 pass around the sprockets 16 and 17. Plates 19 that serve as a conveyor table are secured to the conveyor chains by welding or in other suitable manner over a distance approximately equal to the length of the longest tread which will be used. A gage or guide bar 21 is secured to one of the plates 19 and a second guide bar 22 is secured to a plate adjacent to the opposite end of the conveyor, by screws or bolts 23, the plates at that end of the conveyor being provided with holes or slots 24, whereby the bar 22 may be adjusted relative to the bar 21, to accommodate treads 25 of various lengths.

The upper run of the conveyor is supported against sagging, by a plate 26 which is carried by uprights 27 of the frame, while the lower runs of the chains are held against sagging, by rollers 28 that are mounted in the lower portion of the frame. Idler rollers 29 are journaled on bars 30 that are connected to the frame by posts 31 and 32, these rollers serving to support the edges of tire treads that extend beyond the edges of the conveyor table, to prevent such extended edges from sagging.

When it is desired to place a tread 25 on the conveyor, the conveyor will be held against shifting, by members 33 on a bar 33a that is connected by a link 33b to the handle 14 and is carried by supporting links 35. The weight of the front end of the conveyor frame tends to rock the lever 14 counterclockwise and thus force the latches 33 into the recesses in the sprocket wheels 16, so that there will be no idle shifting of the conveyor while the workman is fitting the tread 25 between the aligning bars 21—22. At this time, the front end of the conveyor is in its lowered position.

When it is desired to place a tread on a tire carcass contained on a tire-building drum 36, upon which fabric plies have been previously wrapped and stitched as explained for example in my Patents 2,228,774 and 2,320,190, the workman will take a rubber tread 25 of approximately the exact length required to properly fit around the drum and the tire carcass thereon, and place it on the conveyor. Owing to the fact that these treads are not always of the precise length desired, it is perhaps necessary to stretch them somewhat or compress them somewhat longitudinally, and this change in length must be effected evenly, so that the weight of the tread will be accurately distributed around the tire, to avoid producing an unbalanced tire structure.

The aligning bar 22 is placed at the exact required distance from the bar 21, whereupon the tread 25 is placed on studs 37 which are pointed slightly so that they will indent or penetrate the adjacent face of the tread 25 a sufficient distance to hold the tread against slipping on the conveyor. If the tread is not quite long enough to fill this space between the bars 21 and 22, one end thereof will be placed against one of the bars and stretched slightly while it is being brought into engagement with the studs 37, so that it will fit against the guide bar at the other end of the conveyor. If the tread is of slightly greater length than required, it will be placed against some of the studs near the middle or at one end of the conveyor, and the operator will compress it somewhat longitudinally, with evenly applied force, to bring it into engagement with the remaining studs and the guide bars 21—22.

Thereupon, the tire-building drum which may be driven as in one of my patents above referred to, and containing the tire carcass, will be set into motion and the operator with his hand or his foot will depress the lever 14 to move the latch bar 33a into release position and to raise the front end of the conveyor frame. He will then manually shift the conveyor chain to move the tread 25 into engagement with the drum 36. Since the periphery of the drum or the upper surface of the tread will be coated with tacky adhesive material in the usual manner, the drag of the rotating drum will continue to move the conveyor and the tread. The front end of the tread will adhere to the drum, so that it will be wrapped around the tire carcass on the drum. During this operation, the operator will hold the free end of the lever 14 down with force sufficient to produce the desired pressure of the tire tread against the drum. When the tire tread has been completely wound around the drum, its forward beveled end thereof will be matched and lapped by the rear beveled end thereof, and the tread will be adhesively connected to the tire carcass. Thereupon, the tire will be removed from the drum for placing in a mold and curing in the usual manner. When a tread has been removed from the conveyor by the drum, the operator will return the conveyor to the position shown in Figs. 1 and 2, by merely manual effort.

In Figs. 3 and 4, I show a simpler arrangement of apparatus, which involves a base 40 upon which a frame 41 is pivotally supported at 42. The frame carries rollers 43 for supporting a plank-like conveyor member 44 that has positioning bars 45 and 46, the bar 46 being adjustable by screws 47 to holes 48 in the plank, to accommodate the device to treads of various lengths. Spikes or slightly sharpened studs 49 are provided to hold the tread against slipping while it is being wound on the drum 36.

In this structure also, means are provided for lifting the tread 25 into engagement with the tire-building drum, such means comprising a crank shaft 51 having a crank arm 52 and link 53, the crank and the link being operated to raise and lower the front end of the frame 41, by a lever 54. In this case also, the drag of the drum when the tread has been brought into engagement therewith, will shift the conveyor board longitudinally until the tread has been completely wound on the drum, whereupon the operator will simply push the conveyor board back to its original position, ready to receive another tire tread.

I claim as my invention:

1. Apparatus for applying a rubber tire tread to a tire carcass that is mounted on a rotatable drum, comprising a conveyor movable past the drum, and means on the conveyor for releasably holding a tread thereon in an extended condition of predetermined length and for supporting it against the pressure of the drum during relative traveling movement of the conveyor and the drum in such direction that the drum has rolling movement on the tread from one end to the other thereof, the tread being freely and progressively releasable from the conveyor, in a direction toward the drum, from said one end to the other end thereof, during said rolling movement, the conveyor extending in a general horizontal direction and the holding means comprising pointed studs projecting upwardly therefrom to engage the adjacent face of the tread and hold it against shifting on the conveyor.

2. Apparatus for applying a rubber tire tread to a tire carcass that is mounted on a rotatable drum, comprising a conveyor frame, a conveyor chain containing tread-supporting plates on a portion of its length, means for releasably holding a tire tread on said plates in an extended condition of predetermined length, a lever connected to the conveyor frame and movable to raise one end thereof, and a latch device actuated by the lever for automatically locking the conveyor against traveling movement when the frame is in lowered position and for automatically releasing it when the lever is operated to raise the frame.

3. Apparatus for applying a rubber tire tread to a tire carcass that is mounted on a rotatable drum, comprising a conveyor mounted for traveling movement past the drum, guide bars on the conveyor and relatively adjustable to respectively engage the ends of a tread that is placed on the conveyor, and pointed studs on the conveyor, between the guide bars for engagement with the adjacent face of a tire tread to hold it against slipping.

EDWIN MILLER.

REFERENCES CITED

The following references are of record in the file of this patent:

UNITED STATES PATENTS

| Number | Name | Date |
| --- | --- | --- |
| 1,353,934 | Morris | Sept. 28, 1920 |
| 1,632,652 | Hutchens et al. | June 14, 1927 |
| 1,758,397 | Harber | May 13, 1930 |
| 2,308,872 | Foster | Jan. 19, 1943 |
| 2,376,494 | Larabee | May 22, 1945 |